United States Patent
Kennerknecht et al.

(10) Patent No.: US 9,616,578 B2
(45) Date of Patent: Apr. 11, 2017

(54) HANDLING APPARATUS OF MODULAR DESIGN FOR HANDLING PARTS

(71) Applicant: Liebherr-Verzahntechnik GmbH, Kempten (DE)

(72) Inventors: Wilhelm Kennerknecht, Immenstadt (DE); Thomas Grötzinger, Immenstadt (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 0 days.

(21) Appl. No.: 14/228,751

(22) Filed: Mar. 28, 2014

(65) Prior Publication Data

US 2015/0246445 A1  Sep. 3, 2015

(30) Foreign Application Priority Data

Feb. 28, 2014  (DE) .................... 20 2014 001 939 U

(51) Int. Cl.
*B25J 15/00* (2006.01)

(52) U.S. Cl.
CPC ....... *B25J 15/0028* (2013.01); *B25J 15/0061* (2013.01); *Y10S 901/38* (2013.01)

(58) Field of Classification Search
CPC .............. B25J 15/0028; Y01S 901/38
USPC ....... 294/119.1, 68.26, 68.27, 86.4; 414/419, 414/420, 421; 220/640; 74/479.01, 74/490.01, 490.03; 188/39, 41; 901/19, 901/23, 26, 27, 31, 39
See application file for complete search history.

(56) References Cited

U.S. PATENT DOCUMENTS

| | | | | |
|---|---|---|---|---|
| 3,586,176 A * | 6/1971 | Rackman et al. | ............ | 414/792 |
| 3,850,313 A * | 11/1974 | Rackman et al. | ............ | 414/591 |
| 4,132,318 A * | 1/1979 | Wang | .................... | B25J 13/082 |
| | | | | 294/86.4 |
| 4,479,673 A * | 10/1984 | Inaba et al. | .................... | 294/207 |
| 4,484,775 A * | 11/1984 | Norkus | ................ | B25J 15/0206 |
| | | | | 269/228 |
| 4,699,414 A * | 10/1987 | Jones | .......................... | 294/119.1 |
| 4,750,132 A * | 6/1988 | Pessina | .................. | B65G 61/00 |
| | | | | 212/286 |
| 4,808,898 A * | 2/1989 | Pearson | .................... | 318/568.21 |
| 5,028,203 A * | 7/1991 | Masini | .................. | B65G 61/00 |
| | | | | 294/119.1 |
| 5,080,415 A * | 1/1992 | Bjornson | ................ | B25J 15/103 |
| | | | | 294/119.1 |
| 5,342,254 A * | 8/1994 | Sula | .............................. | 475/230 |
| 5,411,304 A * | 5/1995 | Muto | ........................ | B66C 1/06 |
| | | | | 294/106 |
| 5,799,543 A * | 9/1998 | Nagai | ...................... | B25J 9/023 |
| | | | | 403/170 |

(Continued)

FOREIGN PATENT DOCUMENTS

DE          198 51 292 A1    5/2000

*Primary Examiner* — Paul T Chin
(74) *Attorney, Agent, or Firm* — Dilworth & Barrese, LLP

(57) ABSTRACT

A handling apparatus for handling parts, in particular large-volume workpieces, and having at least two gripper modules which are disposed opposite one another at a horizontal carrier which can be moved relative to one another and which are driven by a motor. The handling apparatus is of modular design and having at least one carrier module forming the horizontal carrier and at least two gripper modules as components which can be assembled in modular form.

14 Claims, 3 Drawing Sheets

(56) References Cited

U.S. PATENT DOCUMENTS

| | | | | |
|---|---|---|---|---|
| 6,234,737 | B1* | 5/2001 | Young | B25J 5/02 |
| | | | | 414/277 |
| 8,746,416 | B2* | 6/2014 | Gluck | F16C 29/10 |
| | | | | 187/370 |
| 8,863,960 | B2* | 10/2014 | Chaganos | B07C 9/00 |
| | | | | 209/509 |
| 2008/0131248 | A1* | 6/2008 | Friz | B66C 13/04 |
| | | | | 414/561 |
| 2008/0229860 | A1* | 9/2008 | Bonev | B25J 9/106 |
| | | | | 74/479.01 |
| 2011/0089709 | A1* | 4/2011 | Neeper | 294/119.1 |
| 2013/0098714 | A1* | 4/2013 | Kocher | B66B 7/047 |
| | | | | 187/409 |

\* cited by examiner

HANDLING APPARATUS OF MODULAR DESIGN FOR HANDLING PARTS

BACKGROUND OF THE INVENTION

The invention relates to a handling apparatus for handling parts, in particular large-volume workpieces having at least two gripper modules which are disposed opposite one another at a horizontal carrier, which can be moved relative to one another and which are driven by a motor.

Handling apparatus of this kind are known in principle and are used, for example, in the automation of production lines, for example for handling engine blocks, cylinder heads, transmission cases and the like. For this purpose, the handling apparatus are attached to manipulators such as robots or loading portals.

In accordance with the prior art, these handling apparatus are typically configured for a specific gripping procedure and/or are geometrically designed for the part to be gripped. If different parts have to be moved, work is usually carried out using gripper changing apparatus to adapt the manipulator in an automated manner to the new gripping work by replacing the entire handling apparatus. Alternatively, the elements of the handling apparatus, that is, for example, the gripper arms, can be replaced or mounted at a new gripping position for the work to be carried out in the production line by a manual intervention of the plant operator. Such an exchange or a new installation in another orientation is, however, time-consuming and expensive.

Such a handling apparatus is known, for example, from DE 198 51 292 A1 in which a handling apparatus is described in the form of a gripping system for handling large-volume workpieces. With this gripping system, the position of the two clamping arms is adjusted with respect to one another by means of a motor via a right/left threaded spindle or the clamping arms are moved toward one another on the gripping of the workpiece. It is disadvantageous here that only the spacing of the clamping arms from one another can be modified and that in this respect the central position of the workpiece is displaced with asymmetrically designed workpieces. Furthermore only two clamping arms are also provided with this handling apparatus so that longer workpieces or asymmetrical workpieces cannot be picked up.

SUMMARY OF THE INVENTION

It is the object of the invention to further develop a handling apparatus of the category such that a handling apparatus is provided which has a safe function, but which allows parts differing with respect to their dimensions and which can be adapted flexibly to the handling work and to the respective pick-up or gripping points at the workpieces to be moved without the named handling apparatus having to be replaced in each instance.

This object is achieved in accordance with the invention by a handling apparatus which has the features herein.

The basic idea underlying the invention comprises the handling apparatus having a modular structure and at least comprising one carrier module forming the horizontal carrier and at least two gripper modules as components which can be assembled in modular form. The handling apparatus can hereby be assembled differently in accordance with the gripping work to be done. The entire handling apparatus does not have to be replaced in each case. It can preferably be adapted as fast as possible and in an automated manner to different gripping work by an automatic adjustment of the position of the gripping modules with respect to one another. The position of the gripping arms arranged at the gripping modules cannot only be oriented in a linear direction, but also in a plane.

Preferred embodiments of the invention result from the description herein.

The handling apparatus can accordingly have a corresponding number of drive modules depending on the number of the required linear movements of the carrier module and/or of the gripping modules.

The drive modules preferably comprise electric motors, in particular servomotors or stepper motors.

In accordance with an alternative embodiment of the invention, the drive modules can comprise hydraulic cylinders or pneumatic cylinders and/or electric motors.

Depending on the work of the drive module, it should either be capable of moving the gripper arm or the gripper module to and fro between two end points or of positioning the gripper module or the gripper arm at any desired position on the travel path. In accordance with the objective, either a positioning drive such as a servo motor or a stepper motor is thus then selected or a simple drive in the form of a hydraulic cylinder or of a pneumatic cylinder or of a simple electric motor is selected when it is only a question of the movement between two positions.

The connection to a robot or to a loading portal is provided via the carrier module. The carrier module can be rigid at its interface. In accordance with a special embodiment of the invention, it can, however, also be connected to the robot or to the loading portal via a controllable rotary connection so that the total gripper apparatus can be rotated about its vertical axis.

The gripper modules can preferably engage via guide shoes in a linear guide arranged at the carrier module.

When electric motors are used, the gripper modules can have racks into which the pinions engage which are driven by the electric motors. The corresponding linear movement can hereby be executed with high exactness.

The handling apparatus has, in accordance with an especially preferred embodiment of the invention, a control via which the carrier module or the gripper modules can be controlled independently of one another. Settings specific to the workpiece can therefore be made here due to the drive units respectively associated with said modules.

The gripper modules each have at least one gripper arm with which a separate drive can be associated in each case in turn as required. It is thereby possible that the gripper arm can, on the one hand, be moved together with the drive of the gripper module at which it is arranged. On the other hand, it can also be moved by its own drive relative to the gripper module.

In accordance with another preferred embodiment of the invention, the carrier module positions and/or the gripper module positions or the gripper arm position can be adjustable in a change-over station by external coupling of an adjustment device to the respective module. Change-over processes or refitting processes can therefore be carried out here due to the simple coupling of the adjustment device without having to replace the entire gripper modules. In this embodiment of the invention, the movement for opening and closing the gripper preferably takes place via a separate apparatus—e.g. hydraulic cylinders or pneumatic cylinders—at the handling apparatus.

The handling apparatus can also be coupled to the robot or to the loading portal via a compensation unit. It can be used to compensate a correction of a positional error between the workpiece and the gripper apparatus, both in the receiver and in the transfer position.

The carrier module has at least two installation positions to which gripper modules—also of different construction sizes—can be fastened. The corresponding gripper arms via which tool-dependent gripper insets can grip the workpiece can be arranged at the gripper modules.

To grip a workpiece in the loading position, the gripper inserts of the gripper arms have to be moved toward the workpiece. If the workpiece is gripped from the outside, the gripping movement takes place in that two gripper modules are moved toward one another at the carrier module. If the gripping positions are located within a workpiece contour, a reverse gripping movement takes place.

The linear movements of the gripper modules or of the carrier module, on the one hand, and of the gripper arms which are arranged at the gripper modules, on the other hand, are required for different functions. The movements first serve the setting of the arm position relative to the gripping points at the workpiece. An adjustment of the gripping arms in an X-Y plane is necessary depending on the tool size and on the gripping points at the workpiece. In the change-over mode, the base position of the gripper arms or gripper fingers is therefore set relative to the gripping position at the workpiece. In production operation, the gripper apparatus is typically then only positioned relative to the workpiece and the workpiece is gripped via a closing movement of the gripper arms. The workpiece is released from the gripper arms by an opposite movement of the gripper arms.

The handling apparatus in accordance with the invention has the possibility of positioning the workpiece exactly in the X-Y plane via a synchronous movement of the gripper arms. This can simplify the placement of the portal relative to the transfer positions since the latter then no longer have to be oriented so exactly transversely to the portal direction. This was already not a problem in the longitudinal portal direction in known units since the transfer position of the loading portal was adjustable in the longitudinal direction.

The linear movement at the carrier module, on the one hand, and at the gripper modules, on the other hand, can take place via different mechanisms. In addition to a motorized adjustment via electric motors which drive a rack via pinions, other mechanical drive units such as toothed belts can also convert the rotary movement of the motor into a linear movement. Controllable motors have the advantage that the position of the modules can be influenced very exactly via them. The position of the gripper modules relative to the carrier module can thus be changed via motors at the carrier module. Furthermore, both the gripper movement and a positioning movement of the gripper arms or of the gripped workpiece can take place. The same applies to drive units in the gripper modules. The position of the gripper arms mounted at the gripper modules can be set very exactly via said drive units.

In the change-over mode, the respective gripper arm can thus be set individually to the workpiece to be gripped or to its gripping position. In production operation, only the opening or closing movement of the gripper arms is mostly used, but with positioning work also being possible using these gripper arms. With very complex gripping operations, a gripping movement around collision contours at the workpiece can also take place by the separate controllability of the motors. The workpiece can in this respect, for example, also be fed into a clamping apparatus in that specific movements are carried out after one another. Further intermediate modules such as turning devices and the like for pivoting the workpieces can be fastened between the individual modules, that is between carrier modules and gripper modules, but also between the gripper modules and the gripper arms.

Thanks to the modularity of the handling apparatus it can be assembled individually depending on the required work.

Depending on the expansion stage, the handling device can, for example, be equipped with a manual adjustment device. Later, when a higher flexibility is required, motors for the gripper adjustment can then be retrofitted. The handling device can be adapted to the gripping work can be changed over to different gripping work by different construction sizes of the modules.

BRIEF DESCRIPTION OF THE DRAWINGS

Further features, details and advantages of the invention will be explained in the following with reference to different embodiments shown in the drawing. There are shown.

DESCRIPTION OF THE PREFERRED EMBODIMENTS

Figure 1:
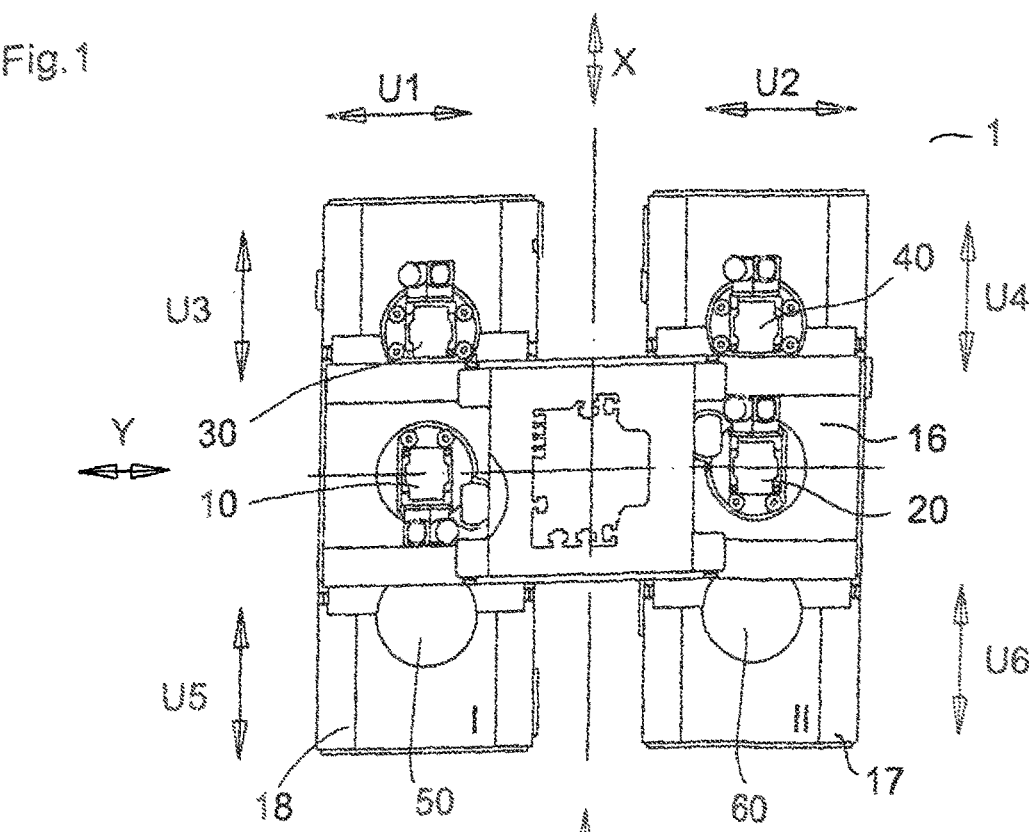
FIG. 1: a schematic plan view of the embodiment of the handling apparatus in accordance with the invention with a carrier module and two gripper modules.
Figure 2:
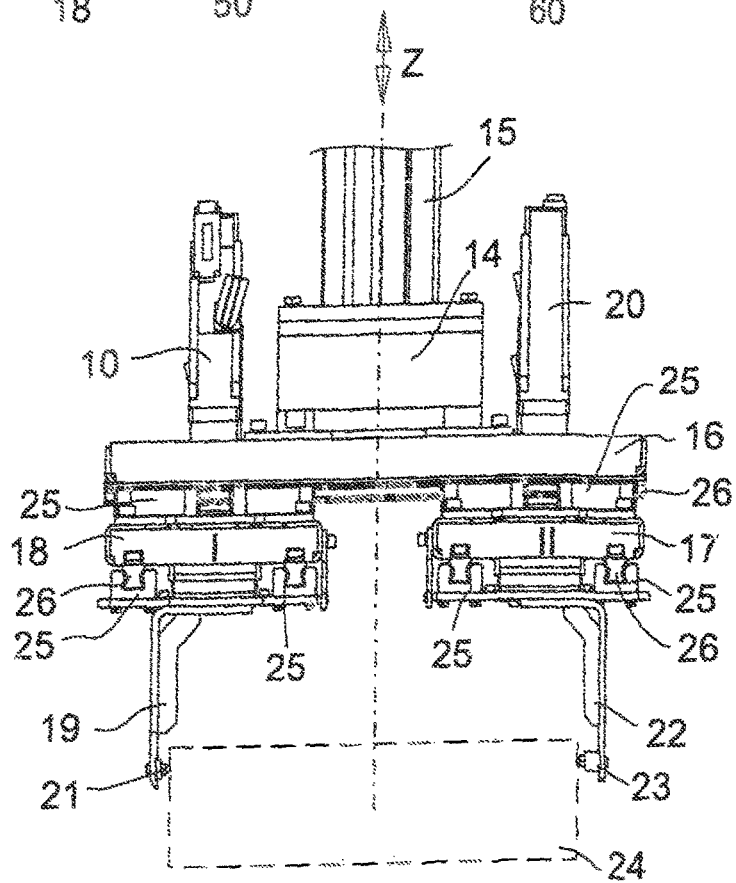
FIG. 2: a side view of the handling apparatus in accordance with FIG. 1.

FIGS. 1 and 2 respectively show a plan view and a side view of the modular handling apparatus 1 in accordance with the invention comprising a carrier module 16 which is connected to a loading portal or robot 15 via a connection piece 14.

The connection piece 14 can be configured as rigid as is shown here. Alternatively, it can also be configured in the form of a rotary connection and/or compensation unit. It is possible with such a rotary connection to rotate the total gripping apparatus about its vertical axis (Z axis). Positional errors of the workpiece with respect to the transfer device can be compensated by the compensation unit. In the embodiment shown here, two gripper modules 17 and 18 of the same construction are connected to the carrier module via guide shoes 25 and a linear guide 26. The gripper modules are in this respect arranged linearly movably at the carrier module. The linear movement of the gripper modules 17 and 18 takes place in the embodiment via servo motors 10 and 20 which each mesh with racks arranged at the gripper modules 17 or 18 by means of a pinion. The position of the individual gripper modules 17 and 18 can be controlled independently of one another via the servo motors 10 and 20 so that the position of the gripper modules 17 and 18 is individually adjustable. The adjustment in the Y direction takes place via a synchronous movement and thus allows a positioning of the workpiece relative to the handling apparatus 1 in the Y direction, that is in the direction of the longitudinal extent of the carrier module 16. A gripping of a workpiece 24 not shown in more detail here takes place in that the gripper modules 17 and 18 are moved toward one another in a controlled manner.

The gripper modules 17 and 18 in turn allow the movement of the gripper arms 19 and 22 with the gripper fingers 21 and 23 fastened thereto along the axial direction of the gripper modules 17 and 18. The gripper fingers 21 and 23 are in this respect the components contacting the workpiece for picking up the workpieces 24 (cf. FIG. 2).

In the same way as with the carrier module 16, the linear adjustment movement in the gripper modules 17 and 18 can take place in a motorized manner via the servo drives 30 and 40. These motors move the gripper arms 19 and 22 over linear guides 25 and 26 in the axial direction of the gripper module. In the embodiment shown here, only one respective gripper arm 19 and 22 respectively is mounted per gripper module. Alternatively, two gripper arms 19, 19' and 22, 22' respectively per gripper module 17 and 18 respectively are mounted in the position shown in plan view in FIG. 1. The gripper arms are thus additionally still adjustable relative to one another so that they can be adapted to different gripping positions at the workpiece. A combination of one and two adjustable grippers or gripper arms per gripper module 17 and 18 is hereby also possible. These different variants are shown in the FIGS. 3a to 3d.

Figure 3A:
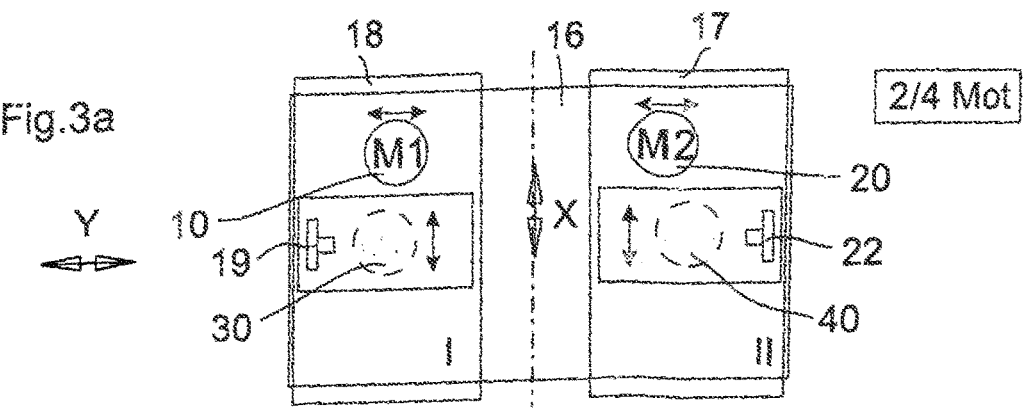
FIGS. 3a-3d: a schematic representation of the modular handling apparatus in different expansion stages.

FIG. 3a schematically shows the simplest expansion stage of the handling apparatus 1 in accordance with the invention having a carrier module 16 and two gripper modules 17 and 18. If only two gripper arms 19 and 22 are provided and if they do not have to be moved along the gripper modules with respect to the X direction, only two motors 10, 20 are required to open or close the gripper. The position can naturally also be varied in the Y direction on the joint movement of these two motors 10, 20. In a further expansion stage, the adjustment possibility of the gripper arms 19, 22 can be provided in the X direction by the installation of one or two further drive units with the motors 30 and/or 40. A retrofitting is also possible here by a subsequent installation of the drive units.

Figure 3B:
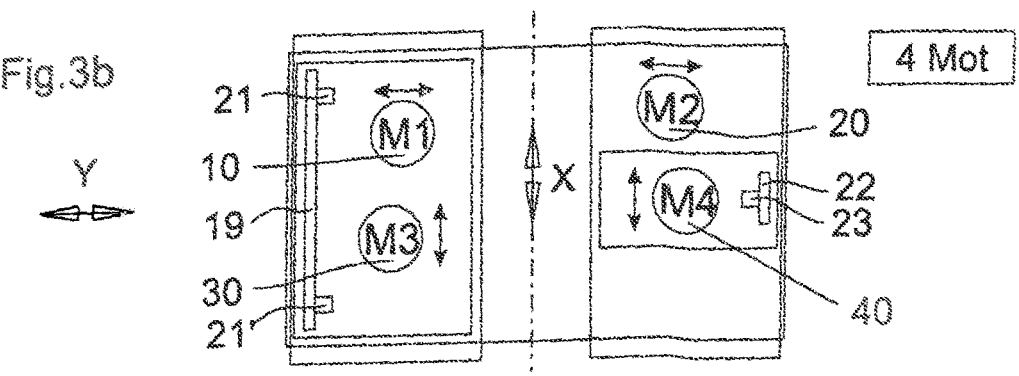

An alternative expansion stage of the handling apparatus in accordance with the invention is shown in FIG. 3b, with a twin gripper being shown at the gripper module 18 here. In this embodiment, two gripper inserts 21 and 21' are mounted at the gripper arm 19, with the position of these two gripper inserts being fixed with respect to one another, that is, not being able to be adjusted. Only one gripper insert 23 is fastened to the oppositely disposed gripper arm 22. In this embodiment, a total of four motors 10, 20, 30, 40 are arranged at the handling apparatus to be able to carry out linear axial movements in the X direction and the Y direction.

Figure 3C:
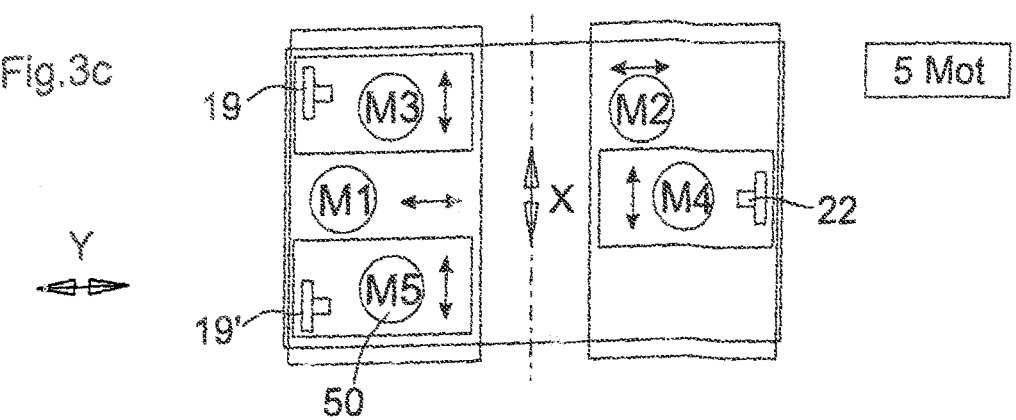

If the two gripper arms 19, 19' at the gripper module 18 are mounted on two independent movement units, as is shown schematically in FIG. 3c, a further drive unit having the motor 50 is required to realize the independent movement of the gripper arms 19 and 19' at the gripper module 18. A carrier module 16 having an installed drive unit with two motors is therefore shown here for adjusting the position of the two gripping modules in the Y direction as well as two motorized adjustments of the position of the two left hand gripper arms and a motorized adjustment of the right hand gripper arm at right angles to the adjustment direction (X direction) of the carrier module 16.

Figure 3D:
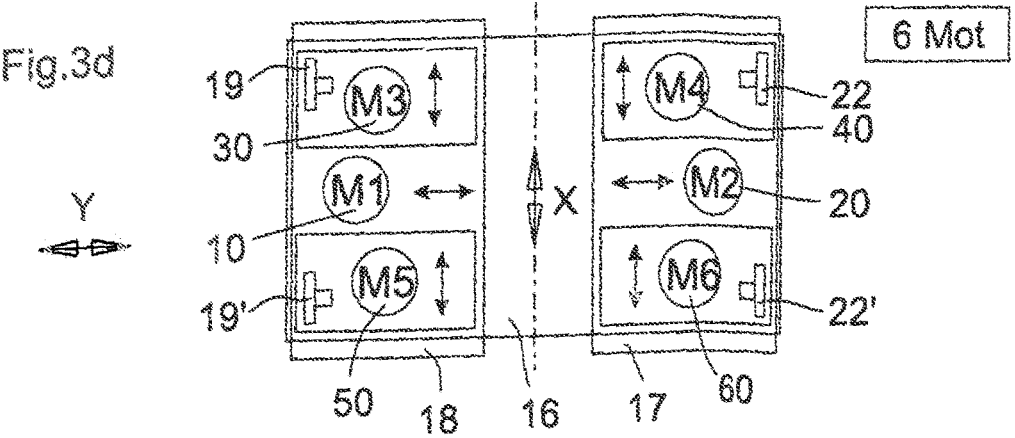

The largest expansion stage of the handling apparatus 1 in accordance with the invention is shown schematically in FIG. 3d. Here, a carrier module 16 having an installed drive unit with two motors for adjusting the position of the two gripper modules 17 and 18 in the Y direction as well as four motorized drive units for the independent adjustment of the position of the two left hand or right hand gripper arms respectively at right angles to the adjustment direction (X direction) of the carrier module are shown. Each gripper arm is thus moved separately via an associated drive unit having motors 10, 20, 30, 40, 50, 60 in the gripper module. The maximum possible freedom of movement of the gripper arms in the X-Y plane can hereby be realized.

Figure 4:
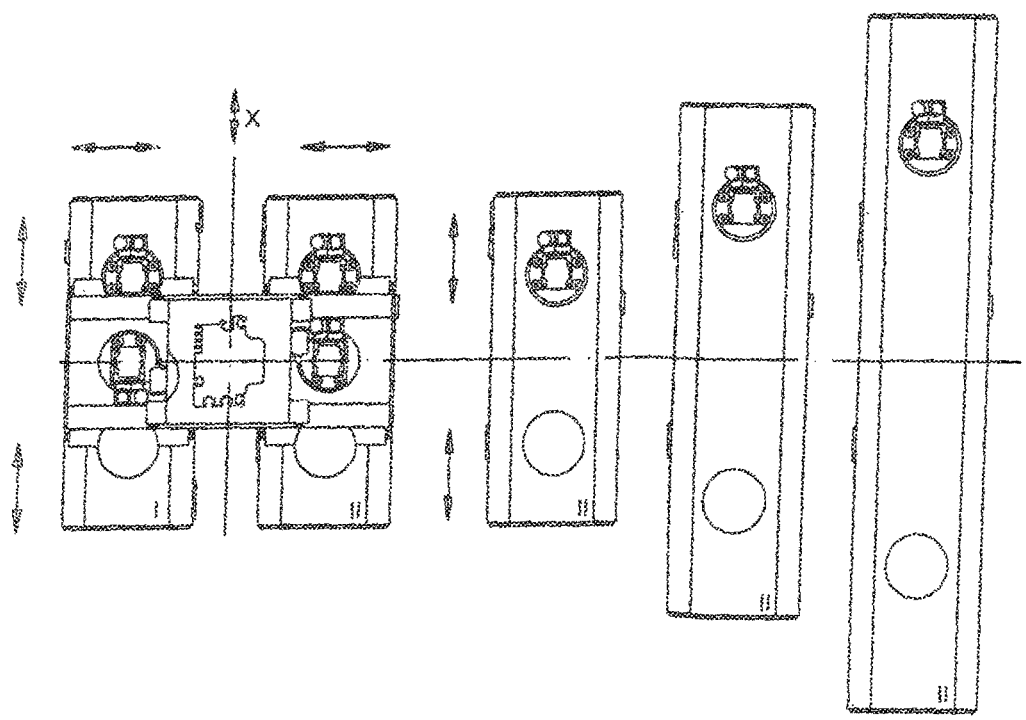
FIG. 4: a schematic plan view of a further embodiment of the handling apparatus in accordance with the invention.
Figure 5:
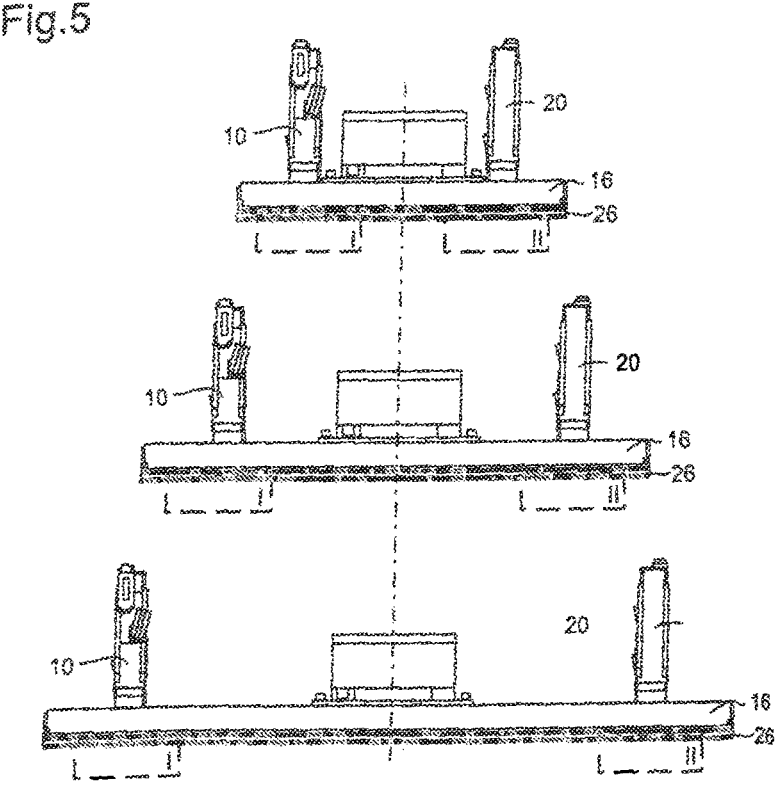
FIG. 5: a schematic plan view of a further embodiment of the handling apparatus in accordance with the invention.

FIGS. 4 and 5 show different construction sizes of gripper modules (FIG. 4) and carrier modules (FIG. 5). A gripper can be relatively simply configured for different sizes of workpieces by a selection and combination of different modules with one another.

A gripper apparatus having two gripper modules (I, II) of the same construction is disclosed at the left in FIG. 4. However, workpieces which have a considerably different extent to the right and to the left at their gripping positions can be gripped by installation of two gripper modules of different sizes at one carrier module. In this respect, the gripping position of the gripping modules (I, II) can be swapped as desired. The carrier modules 16 are also in different construction sizes, as is shown in FIG. 5. The handling apparatus can be configured very flexibly by this modularization and can thus be adapted very simply to different workpiece sizes in the first configuration or be set very simply in ongoing production operation within the framework of the adjustment paths to the different workpieces.

The invention claimed is:

1. A handling apparatus for handling parts, and having at least two gripper modules (17, 18) which are disposed on opposite sides from one another of a vertical axis (Z) extending through a horizontal carrier (16), movable relative to one another and driven by a motor (10, 20) mounted to and directly above the horizontal carrier (16), wherein the handling apparatus is of modular design and comprises at least one carrier module forming the horizontal carrier (16) and at least two gripper modules (17, 18) as components which are assembled in modular form, with the gripper modules (17, 18) mounted to and directly underneath the horizontal carrier (16) through a first set of linear guides and shoes (25, 26) respectively affixed to the gripper modules (17, 18) and horizontal carrier (16), to be independently adjustable from one another in both lateral (X) and longitudinal (Y) directions of a plane perpendicular to the vertical axis (Z) by the motor (10, 20), gripper arms (19, 22) are respectively mounted upon and underneath each said gripper module (17, 18) through a second set of linear guides and shoes (25, 26) respectively affixed to the gripper arms (19, 22) and respective gripper modules (17,18) to be movable in an axial direction of the respective gripper module (17, 18), and gripper fingers (21, 23) are situated at an end of each said gripper arm (19, 22) remote from the respective gripper module (17, 18) and arranged to contact and pick up a workpiece (24).

2. A handling apparatus in accordance with claim 1, wherein the grippers on the modules are independently adjustable from one another in lateral (X) direction of the plane perpendicular to the vertical axis (Z) by a corresponding number of drive modules provided in dependence on the number of required linear movements.

3. A handling apparatus in accordance with claim 2, wherein the drive modules comprise electric motors.

4. A handling apparatus in accordance with claim 2, wherein the drive modules comprise electric motors or hydraulic cylinders or pneumatic cylinders.

5. A handling apparatus in accordance with claim 1, wherein the carrier module is connected to a robot or to a loading portal via a rotary device.

6. A handling apparatus in accordance with claim 1, wherein the gripper modules have racks into which pinions driven via electric motors engage.

7. A handling apparatus in accordance with claim 1, wherein it has a control via which the carrier module and the gripper modules can be controlled independently of one another.

8. A handling apparatus in accordance with claim 1, wherein the gripper modules each have at least one gripper arm with which separate drives can be associated as required.

9. A handling apparatus in accordance with claim 1, wherein the carrier module position and the gripper module position or the gripper arm position is adjustable in a change-over station by external coupling of an adjustment device to the respective module.

10. A handling device in accordance with claim 1, additionally comprising a compensation device arranged to connect the carrier module to a robot or a loading portal.

11. A handling apparatus in accordance with claim 1, comprising
two said motors (10, 20),
two said gripper arms (19, 22) each mounted upon a respective gripper module (17, 18).

12. A handling apparatus in accordance with claim 1, comprising
four said motors (10, 20, 30, 40),
two gripper inserts (21, 21') mounted on one (19) of the gripper arms (19, 22), with position of said gripper inserts (21, 21') being fixed with respect to one another, and
one gripper insert (23) mounted on the oppositely-disposed gripper arm (22).

13. A handling apparatus in accordance with claim 1, comprising
five said motors (10, 20, 30, 40, 50),
two gripper arms (19, 19') mounted on one (18) of the gripper modules (17, 18), with said gripper arms (19, 19') being independently movable with respect to one another, and
one gripper arm (22) mounted on the oppositely-disposed gripper module (17).

14. A handling apparatus in accordance with claim 1, comprising
six said motors (10, 20, 30, 40, 50, 50),
two gripper arms (19, 19'; 22, 22') mounted on each said gripper module (17, 18), with said gripper arms (19, 19'; 22, 22') on each gripper module (17, 18), being independently movable with respect to one another.

* * * * *